Figure 1:
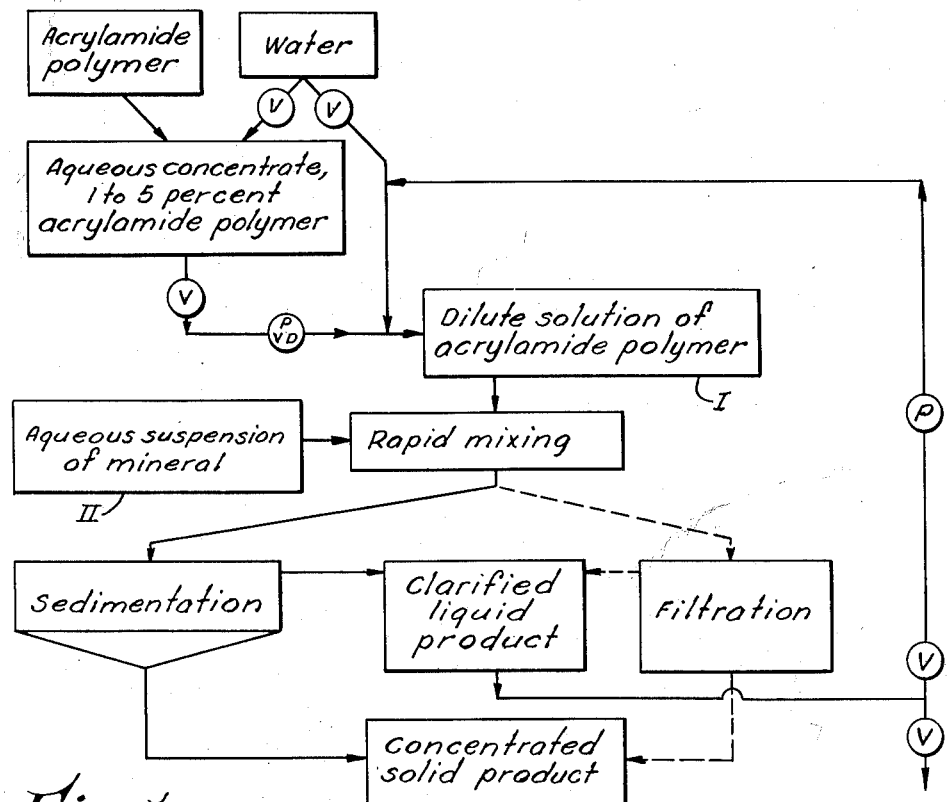

April 30, 1963            D. J. PYE            3,087,890

METHOD OF APPLYING ACRYLAMIDE POLYMER FLOCCULANTS

Filed March 7, 1961

INVENTOR.
David J. Pye

BY

Griswold & Burdick,
ATTORNEYS

United States Patent Office 3,087,890
Patented Apr. 30, 1963

3,087,890
METHOD OF APPLYING ACRYLAMIDE POLYMER FLOCCULANTS
David J. Pye, Walnut Creek, Calif., assignor to The Dow Chemical Company, Midland, Mich, a corporation of Delaware
Filed Mar. 7, 1961, Ser. No. 94,085
4 Claims. (Cl. 210—53)

This invention is concerned with the recovery of finely divided mineral solids from aqueous suspension and is particularly directed to an improved method for accomplishing the concentration or separation of such solids from aqueous suspensions thereof.

This application is a continuation-in-part of my co-pending application, Serial No. 438,614, filed June 22, 1954, now abandoned, entitled Separation of Minerals.

It has now been found that in operations employing water-soluble high molecular weight polymers of acrylamide for the concentration and separation of finely divided mineral solids from aqueous suspensions, marked improvement with respect to the rates of settling and filtration of such aqueous suspensions of finely divided solids is obtained when the admixture of the polymeric product is accomplished in a manner such as to assure thorough mixing with a minimum of turbulent agitation until the completion of the concentration or separation procedure. Further, concentrated suspensions of increased density are obtained when sediments resulting from the above operations are subjected to a moderate degree of mechanical working after the initial period of relatively free settling.

The water-soluble high molecular weight polymers of acrylamide, hereinafter called "acrylamide polymers," employed in the present invention, are polyacrylamide products substantially free of cross-linking and characterized by a viscosity of at least about 1.0 centipoise. Operable polyacrylamide products include the homopolymer of acrylamide and also copolymers of acrylamide with up to about 15 percent by weight of other suitable monomers such as acrylic acid, alkyl esters of acrylic acid and methacrylic acid, methacrylamide, styrene, vinyl acetate, acrylonitrile, methacrylonitrile, vinyl alkyl ethers, vinyl and vinylidene chloride and the like, provided that each such polymeric material be characterized by water solubility, freedom from cross-linking and the indicated minimum viscosity. The term "viscosity," wherever used herein, refers to the viscosity of a 0.5 percent by weight solution of polymer in distilled water adjusted to a pH of 3 to 3.5 and at a temperature of 21.5° C., as determined with an Ostwald viscosimeter.

Water-soluble acrylamide polymers are sometimes characterized by a greater or less degree of hydrolysis, i.e., contain some free carboxyl groups. This condition is dependent upon the method of manufacture of the polymer, the presence or absence of small amounts of acrylic acid in the starting monomer and conditions of storage of the polymer. The polymer products appear to be equivalent whether the carboxyls result from copolymerization of acrylamide with acrylic acid or from hydrolysis of amide groups subsequent to polymerization. In the practice of the present invention, the operable acrylamide polymers encompass those having not more than about 15 percent of the amide groups replaced by carboxyl groups, as set forth in the above definition of operable polyacrylamide products.

In carrying out the invention, the acrylamide polymer is dispersed throughout the suspension of finely divided mineral solids rapidly and with a minimum of violent or turbulent agitation and the treated suspension is thereafter passed into a quiescent zone to bring about the development of agglomerates of the finely divided mineral. Such development appears to be favored by the avoidance of shearing forces which tend to break up the agglomerates as formed. To accomplish such admixture throughout the suspension in accordance with the present invention, the acrylamide polymer is introduced in the form of a dilute aqueous solution. Such solution is then admixed with the suspension of finely divided mineral solids in any suitable fashion, provided only that the mixing is accomplished rapidly and without violent agitation. For example, the polymer solution may be sprayed into a flume or other conduit through which the suspension is moving. In such operations the conduit may be equipped with baffle plates, slow-moving paddle agitators or the like, at or immediately following the point of introduction of the polymer solution in order to assure thorough mixing. Similarly the acrylamide polymer solution and suspension of finely divided solids may be pumped together into a mixing chamber designed to utilize the momentum of the liquids to accomplish a thorough and gentle mixing. Alternatively, in a preferred mode of mixing, the solution of acrylamide polymer is added portionwise to the suspension while the latter is subjected to gentle mixing agitation. Following the mixing step the treated suspension is allowed to flow or is otherwise transported with a minimum of agitation to the apparatus employed in subsequent separation steps.

In practice the acrylamide polymer is dissolved in water to prepare a solution containing not more than about 0.5 percent by weight and preferably not more than about 0.1 percent by weight of the polymer. The resulting solutions are homogeneous and free-flowing and are readily handled in conventional equipment such as gravity feeders, proportioning pumps and the like. In such operations, it is frequently convenient to prepare an aqueous concentrate containing from about 1 to 5 percent by weight of the acrylamide polymer and to dilute such concentrate as needed for use.

It is already known that commercial filtration equipment, when considered from the standpoint of the weight of solids separated per unit area of filter surface per unit time, generally operates more efficiently on pulps of high solids content than on dilute pulps. It is therefore surprising that increased efficiency in filter operations is obtained by adding dilute aqueous solutions of the polymeric products employed in the present invention to mineral pulps and slimes before filtering, even though such addition may result in appreciable dilution of the mineral suspension. Depending upon the concentration and characteristics of the solids in the suspension to be treated, it is usually observed that, with increasing dilution of the acrylamide polymer solution, the filtration rate in terms of weight of solids filtered per square foot of filter area per unit time passes through a maximum. Where the treated suspension is to be filtered directly after the addition of the acrylamide polymer, it is preferred to employ the acrylamide polymer in the form of an aqueous solution containing at least about 0.02 percent by weight of the polymer. However, where a sedimentation step follows the addition of the acrylamide polymer, good results have been obtained when employing a solution containing at least about 0.0025 percent by weight of polymer.

In some instances, particularly where the filtrate carries valuable constituents which are to be recovered at some later stage of a process, it is undesirable to cause dilution of the filtrate. In a preferred embodiment of the invention, the dilute solution of the acrylamide polymer is prepared by dissolving the polymer in filtrate from an earlier batch of the mineral suspension to be treated. By operating in such manner, dilution of the filtrate with respect to valuable constituents contained therein is avoided. Alternatively, the dilute polymer solution may be prepared with filtrate from a washing step in the cycle of operations so that the advantages of countercurrent recycling are achieved.

In a further preferred embodiment of the invention the treated suspension of finely divided solids resulting from the admixture of a dilute solution of the polymer of acrylamide, as set forth above, is conveyed directly from the mixing step to a settling basin, continuous thickener or the like where the agglomerates resulting from the treatment may be settled to produce a layer of concentrated mineral product and a layer of relatively clear overflow liquid. The latter liquid may then conveniently be recycled in whole or in part and employed in preparing the polymer solution for further treating operations.

In sedimentation operations employing mineral suspensions it is generally observed that the suspended solids settle at a rate which varies with time. Usually after a period of relatively free settling the solids enter a stage in which many of the solid particles are in physical contact with other particles and the rate of subsidence of the solids is diminished. Suspensions in the latter state are said to be in the compression zone or zone of compaction. In some cases it has been found that suspensions, when treated with a flocculating amount of an acrylamide polymer in accordance with the present invention, form flocculated agglomerates of considerable mechanical stability. Under such conditions, further settling of the solids takes place very slowly after the suspension reaches the zone of compaction. In such circumstances it has been found that mild working, such as can be accomplished with slow moving paddles or rakes operating in the zone of compaction, results in the formation of a settled product of increased solids content. In a preferred embodiment of the invention the aqueous suspension of finely divided mineral solids, after admixture with an acrylamide polymer and conveyance to a quiescent zone for settling, is thereafter submitted to the operation of mild working in the zone of compaction.

The amounts of acrylamide polymer to be employed will vary depending upon the composition of the suspension of finely divided solids and the desired improvement in rate of settling or filtration and/or clarification of liquid effluent. In general, from about 0.001 to about 2 pounds of the acrylamide polymer is employed per ton of solids in the suspension, the operable minimum being that amount required to accomplish the flocculation and sedimentation of the suspended solids. Useful improvements as, for example, in the operation of continuous thickeners are sometimes accomplished with even lower dosages of the polymeric agent and larger proportions of the polymer may be employed, if desired, with continued good results, although economic factors generally render such larger dosages impractical except in unusual circumstances.

In the accompanying drawing, FIGURE 1 is a simplified general flow-sheet of a plant employing the method of the present invention. The figure shows the preparation of the dilute aqueous solution of acrylamide polymer (I) and rapid, thorough mixing thereof with the aqueous suspension of mineral (II). After the mixing step, alternative procedures of sedimentation (solid lines) or filtration (broken lines) are shown as means for separating clarified liquid product from concentrated solid product. The valve system on the clarified liquid product outlet illustrates one mechanism for recycling all or part of said liquid product if desired.

Figure 2:
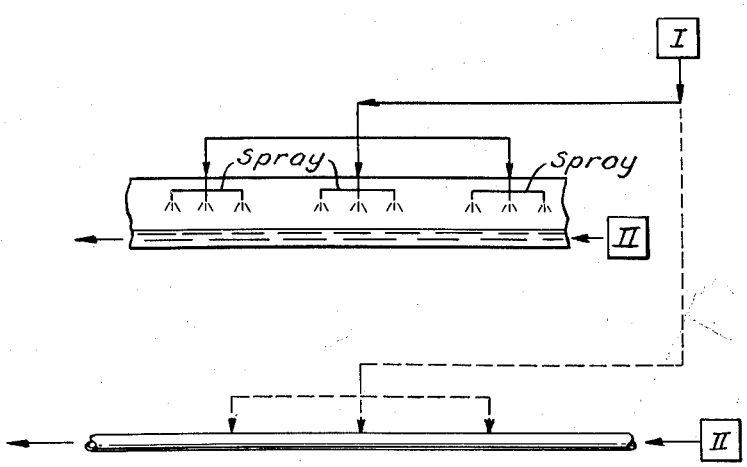

FIGURE 2 illustrates schematically one mode of the portionwise addition of the acrylamide polymer solution to the suspension of finely divided mineral. Thus, in the upper half of the figure the dilute solution of acrylamide polymer (I) is added to the aqueous suspension of mineral (II) by spraying from multiple spray-heads spaced over a flume through which the suspension is moving. Similarly, in the lower half of the figure the dilute solution of acrylamide polymer (I) is added to the aqueous suspension of mineral (II) by injecting at multiple points spaced along a pipe through which the suspension is moving.

The following examples illustrate the invention but are not to be construed as limiting the same.

*Example 1*

A typical South African gold ore from the Witwatersrand formation had been crushed and treated by the cyanide process for recovery of gold values. The resulting finely divided product was dispersed in water to form a slurry containing 50 percent by weight of solids. An acrylamide polymer characterized by 4 percent hydrolysis and a viscosity of 9.8 centipoises was dissolved in water to prepare solutions containing 2, 0.4, 0.2, 0.1, 0.07, 0.04, 0.03, 0.02, 0.01 and 0.005 percent by weight of the polymer. Each of the solutions was rapidly mixed with a portion of the ore slurry in sufficient amount to provide 0.2 pound of polymer per ton of slurry solids. The resulting treated slurries were filtered one minute after admixture with the polymer solutions on a vacuum leaf filter using a 15-second cake formation period. During the addition of polymer solution and subsequent filtration, the solids were maintained in suspension by a paddle agitator operating at 100 revolutions per minute. This amount of agitation had been determined to be about the minimum necessary to maintain a uniform suspension of solids in contact with the filter surface. A portion of the untreated slurry was filtered in a similar manner to serve as a check. The rates of filtration are summarized in the following table where the rates are calculated on the assumption of a continuous rotary filter running at 30 percent immersion with 35 percent down time.

| Concentration of acrylamide polymer, percent by weight | Percent solids in treated slurry | Filtration rate, pounds of solid per square foot per day |
|---|---|---|
| 0.0 (Blank) | 50 | 1,500 |
| 2.0 | 50 | 1,880 |
| 0.4 | 49.5 | 2,160 |
| 0.2 | 49.0 | 2,240 |
| 0.1 | 47.6 | 2,720 |
| 0.07 | 46.7 | 2,800 |
| 0.04 | 44.6 | 3,320 |
| 0.03 | 42.2 | 3,200 |
| 0.02 | 40.2 | 2,960 |
| 0.01 | 33.6 | 2,220 |
| 0.005 | 25.3 | 930 |

*Example 2*

The acrylamide polymer of Example 1 was dissolved in water to prepare solutions containing 0.4, 0.1, 0.04, 0.02, 0.005 and 0.0025 percent by weight of the polymer. Each of the solutions was added to a portion of a slurry containing 40.2 percent by weight of the ore solids employed in Example 1. The amount of each polymer solution was adjusted to provide 0.2 pound of polymer per ton of solids. Stirring was used to accomplish thorough mixing of the polymer solution with the slurry in a short period of time and thereafter stirring was discontinued to allow sedimentation of the solids. Rapid settling ensued and a quantity of clear supernatant liquid equal to the volume of polymer solution introduced was withdrawn in order to leave each treated slurry with the original solids content of 40.2 percent. The slurry solids were then maintained in suspension by the paddle agitator and filtered as in Example 1. Filtration was begun 5 minutes after starting the agitator. The filtration rates, calculated as before, are summarized in the following table:

| Concentration of acrylamide polymer, percent by weight | Filtration rate, pounds of solid per square foot per day |
| --- | --- |
| 0.0 (Blank) | 720 |
| 0.4 | 900 |
| 0.1 | 1,200 |
| 0.04 | 1,500 |
| 0.02 | 1,840 |
| 0.005 | 1,980 |
| 0.0025 | 2,000 |

*Example 3*

Tailings from the recovery of gold by the cyanide process from Witwatersrand conglomerate ore (South Africa) were leached with sulfuric acid for the recovery of soluble mineral values. This operation yielded a slime containing about 50 percent by weight of finely divided solids in an acidic aqueous medium at a pH of about 1.3 to 1.9. An acrylamide polymer characterized by 0.85 percent hydrolysis and a viscosity of 7.7 centipoises was dissolved in water to prepare solutions containing 0.4, 0.059 and 0.04 percent by weight of the polymer. Each of the solutions was admixed with a portion of the ore slime in the amount of 0.1 pound of polymer per ton of ore solids. The treated slimes and an untreated portion thereof were filtered by the procedure of Example 1. The filtration rates, calculated for a continuous vacuum filter operating at 30 percent immersion with a 30-second cake formation period and assuming 35 percent out-of-service time for cleaning and maintenance, are presented in the following table:

| Concentration of acrylamide polymer, percent by weight | Filtration rate, pounds of solid per square foot per day |
| --- | --- |
| 0.0 (Blank) | 190 |
| 0.4 | 760 |
| 0.059 | 940 |
| 0.04 | 1,240 |

*Example 4*

A phosphate ore from the so-called "leach zone" overlying a Florida phosphate deposit was beneficiated by grinding and wet-screening with removal of the fraction of size less than 14 mesh and greater than 150 mesh, the latter consisting chiefly of silica impurities. The remaining solids, consisting chiefly of calcium phosphate and clay smaller than 150 mesh, were suspended in water to form a slurry containing 20 percent by weight of solids. To separate portions of this slurry, the acrylamide polymer of Example 1 was added with stirring in the amount of 1 pound per ton of solids and in the form of aqueous solutions containing 0.04 and 0.02 percent by weight of the polymer, respectively. The treated slurries and a portion of the untreated slurry were maintained undisturbed in sedimentation vessels for a period of one hour. At this time the concentration of solids in the settled layer was determined. The results are reported in the following table:

| Concentration of acrylamide polymer, percent by weight | Concentration of settled solids after one hour, percent by weight |
| --- | --- |
| 0.0 (Blank) | 22 |
| 0.04 | 34.3 |
| 0.02 | 41.8 |

*Example 5*

The beneficiated "leach zone" ore of Example 4 was dispersed in water to form a slurry containing 45 percent by weight of solids. The slurry was found to filter very slowly and to give a filter cake containing only about 50 percent solids. A portion of the above slurry was admixed with an aqueous solution containing 0.04 percent by weight of the polyacrylamide of Example 1 in an amount sufficient to provide 1.8 pounds of polyacrylamide per ton of solids. The solids thereupon settled rapdily to separate a clear supernatant liquid layer and a lower layer containing 77.3 percent by weight of solids after 24 hours. The supernatant liquid was decanted and the solids worked gently with a paddle-like device with intermittent decantation of supernatant liquid to separate the product as a pasty solid containing 12.7 percent by weight of water.

*Example 6*

Portions of the 45 percent solids slurry of Example 5 were admixed with a solution containing 0.2 percent by weight of the acrylamide polymer of Example 1 in an amount to provide 1 pound of polymer per ton of solids. To one portion the polymer solution was added all at once with gentle mixing while to the other the addition was made in five increments of 0.2 pound per ton each with gentle stirring between increments. After undisturbed sedimentation for a period of time, the solids contents of the settled layers was determined wtih the following results:

| Method of Addition of Polymer Solution | Concentration of Solids, Percent by Weight |
| --- | --- |
| Single increment | 58.8 |
| Portionwise (5 increments) | 78.8 |

*Example 7*

An acrylamide polymer characterized by hydrolysis of 2.9 percent and a viscosity of 5.8 centipoises was dissolved in water to prepare a solution containing 0.04 percent by weight of the polymer. The resulting solution was added in the amount of 0.2 pound of polymer per ton of solids by several different methods to portions of the acid-leached ore slime of Example 3. The methods of admixing the polymer solution with the slime were as follows:

(1) The solution was added slowly and continuously over a period of about 20 minutes to the slime while the latter was being vigorously agitated.
(2) The polymer was run into the slime in a rapid stream in a period of less than 1 minute while the slime was being vigorously agitated.
(3) The solution and slime were simultaneously introduced into a mixing chamber so that the momentum of the two streams effected rapid mixing. The mixture was then stirred gently with a paddle-type device for a period of 15 seconds and then conveyed to the filter.

Each of the above treated slimes was filtered on a vacuum leaf filter employing a 30 second cake formation period. The filtration rates calculated for a continuous vacuum filter operating at 30 percent immersion and assuming 35 percent out-of-service time for cleaning and maintenance are summarized in the following table:

| Method of Addition of Polymer Solution | Filtration Rate, Pounds of Solid Per Square Foot Per Day |
| --- | --- |
| (1) Slow addition with vigorous agitation | 1,920 |
| (2) Rapid addition with vigorous agitation | 2,500 |
| (3) Rapid addition with gentle agitation | 4,000 |

Example 8

An acid leached African ore slime similar to that in Example 3 was found to filter at the rate of about 340 pounds of solids per square foot of filter area per day. The filtrate from such an operation was employed to dissolve the acrylamide polymer of Example 6 to prepare a solution containing 0.04 percent by weight of polymer. This solution was rapidly mixed with a further portion of the above ore slime in the amount of 0.2 pound of polymer per ton of solids. The treated slime was filtered 1 minute after admixture of the polymer solution and found to have a filter rate of 2640 pounds of solids per square foot per day, calculated as in the preceding example.

Example 9

The ore slime and acrylamide polymer solution of Example 8 were mixed together to produce a treated slime containing 0.2 pound of the polymer per ton of solids. The resulting treated slime was vigorously agitated with a mechanical stirrer operating at 300 revolutions per minute. At varying periods after initiation of agitation, the filtration rate of the slime was determined. The results are summarized in the following table:

| Minutes of Agitation | Filtration Rate, Pounds of Solid Per Square Foot Per Day |
| --- | --- |
| 0.5 | 3,820 |
| 1.0 | 3,340 |
| 1.5 | 2,640 |
| 2.0 | 2,270 |
| 3.0 | 1,370 |
| 6.0 | 1,210 |
| 75.0 | 660 |

What is claimed is:

1. In the method for concentrating and separating finely divided mineral solids from aqueous suspension by admixing with the suspension a water-soluble, high molecular weight, acrylamide polymer selected from the group consisting of the homopolymer of acrylamide and copolymers of acrylamide with up to about 15 percent by weight of another monomer selected from the group consisting of acrylic acid, alkyl esters of acrylic acid and methacrylic acid, methacrylamide, styrene, vinyl acetate, acrylonitrile, methacrylonitrile, vinyl alkyl ethers, vinyl chloride and vinylidene chloride, said polymer being characterized by a viscosity of at least 1 centipoise for a 0.5 percent by weight solution thereof in distilled water, adjusted to a pH of 3–3.5 and at a temperature of 21.5° C., the improvement which comprises admixing said polymer with the suspension of mineral solids in the form of an aqueous treating solution containing not more than 0.5 percent by weight of the polymer, said treating solution being added to the suspension portionwise as multiple, substantial increments with gentle mixing, said portionwise addition being accomplished by conducting the suspension of mineral through a conduit while introducing said treating solution at a plurality of spaced-apart positions along said conduit and the treated suspension being thereafter passed into a quiescent zone and maintained under conditions of minimal agitation until the desired separation is completed.

2. A method in accordance with claim 1 wherein the aqueous treating solution is added in an amount to provide from about 0.01 to about 2 pounds of polymer per ton of solids in the suspension and sufficient to accomplish the flocculation and sedimentation of the solids, and the treated suspension is thereafter transported to a filter surface with a minimum of agitation and filtered to separate the clarified filtrate and a filter cake of the solids.

3. A method according to claim 1 wherein the treating solution contains from about 0.0025 to about 0.1 percent by weight of the polymer and is employed in an amount to provide from about 0.001 to about 2 pounds of the polymer per ton of solids in the suspension and sufficient to accomplish the flocculation and sedimentation of the solids and wherein the treated suspension is maintained after treatment under conditions of minimal agitation and separated into a clarified aqueous fraction and a fraction concentrated with respect to the solids.

4. A method according to claim 3 wherein a portion of the clarified aqueous fraction is recycled to prepare the dilute treating solution of acrylamide polymer for addition to subsequent portions of the suspension.

References Cited in the file of this patent

UNITED STATES PATENTS

| | | |
| --- | --- | --- |
| 2,202,135 | Bevan | May 28, 1940 |
| 2,740,522 | Aimone et al. | Apr. 3, 1956 |
| 2,937,143 | Goren | May 17, 1960 |
| 2,980,609 | House et al. | Apr. 18, 1961 |
| 2,981,630 | Rowland | Apr. 25, 1961 |
| 2,995,512 | Weider et al. | Aug. 8, 1961 |

FOREIGN PATENTS

| | | |
| --- | --- | --- |
| 435,126 | Great Britain | Sept. 16, 1935 |
| 475,671 | Great Britain | Nov. 24, 1937 |

OTHER REFERENCES

Schweitzer: "The Creaming of Rubber Latex," in Rubber Chemistry and Technology, vol. 13, pages 408–414 (1940).

Babbitt: "Sewage and Sewage Treatment," Sixth Ed., John Wiley and Sons, New York, 1947, pages 386–387 and 395–397.